No. 663,266. Patented Dec. 4, 1900.
A. S. FITCH.
METHOD OF PRODUCING SCENIC REPRESENTATIONS.
(Application filed June 12, 1900.)
(No Model.) 3 Sheets—Sheet 1.

WITNESSES: INVENTOR:

No. 663,266. Patented Dec. 4, 1900.
A. S. FITCH.
METHOD OF PRODUCING SCENIC REPRESENTATIONS.
(Application filed June 12, 1900.)
(No Model.) 3 Sheets—Sheet 2.

WITNESSES: INVENTOR:

No. 663,266. Patented Dec. 4, 1900.
A. S. FITCH.
METHOD OF PRODUCING SCENIC REPRESENTATIONS.
(Application filed June 12, 1900.)
(No Model.) 3 Sheets—Sheet 3.
Fig.3.
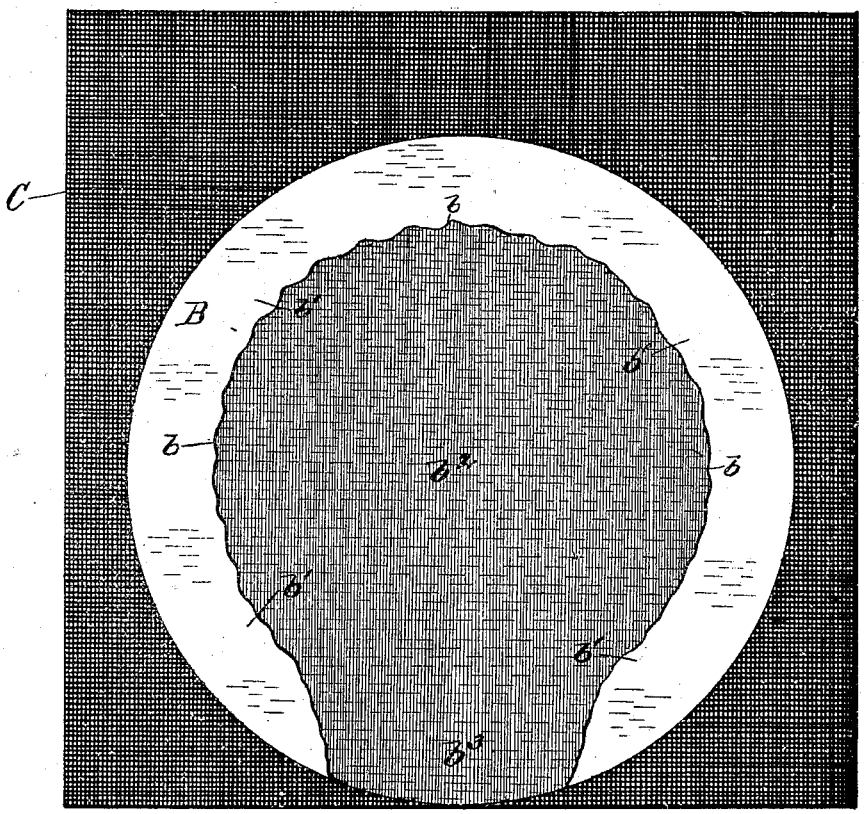
Fig. 4. Fig. 5. Fig. 6.
 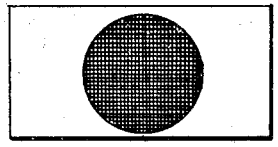 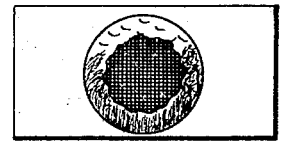
WITNESSES: INVENTOR.
William Raymond. Arden Seymour Fitch.
Thos. O'Connor.

UNITED STATES PATENT OFFICE.

ARDEN SEYMOUR FITCH, OF NEW YORK, N. Y., ASSIGNOR TO DOLORES DE SANTA MARIA D'YBERRI FITCH, OF GUAYMAS, MEXICO.

METHOD OF PRODUCING SCENIC REPRESENTATIONS.

SPECIFICATION forming part of Letters Patent No. 663,266, dated December 4, 1900.

Application filed June 12, 1900. Serial No. 20,083. (No model.)

*To all whom it may concern:*

Be it known that I, ARDEN SEYMOUR FITCH, a citizen of the United States, and a resident of the city of New York, county and State of New York, have invented certain new and useful Improvements in Methods of Producing Scenic Representations, of which the following is a full, clear, and exact description, reference being had to the accompanying drawings, forming part of this specification.

My invention relates to the production of scenic representations upon the stage of a theater; and the object of my invention is to enable the production to be made in succession of a series of different scenic representations upon a stage without moving or changing or otherwise disturbing the scene frames or cloths set or hung on the stage and on which the scenic effects are portrayed and without the lowering of a curtain to obscure the view of the stage from the audience-chamber of the theater during the intervals between the scenic representations of the series thereof in their production in succession and also to permit the presence and movement upon the stage in said successive scenic representations of figures or performers.

My invention comprises, primarily, the method of producing a scenic representation which consists in projecting, by concentrated light thrown through a picture and refracting medium, as by a stereopticon or magic lantern, an image of said picture upon the marginal portion of a centrally-apertured forwardly-located screen and simultaneously similarly projecting the image of a picture upon a continuous screen located rearwardly of said marginal screen.

Figure 1:
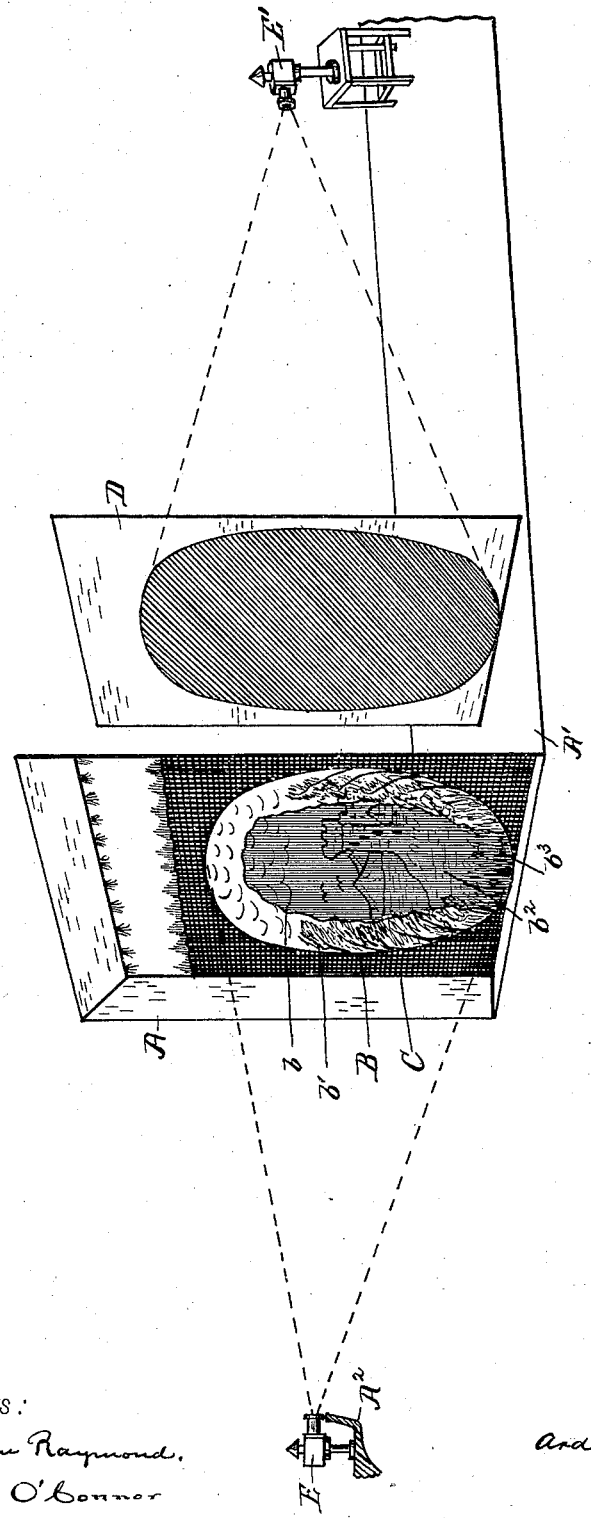
Figure 2:
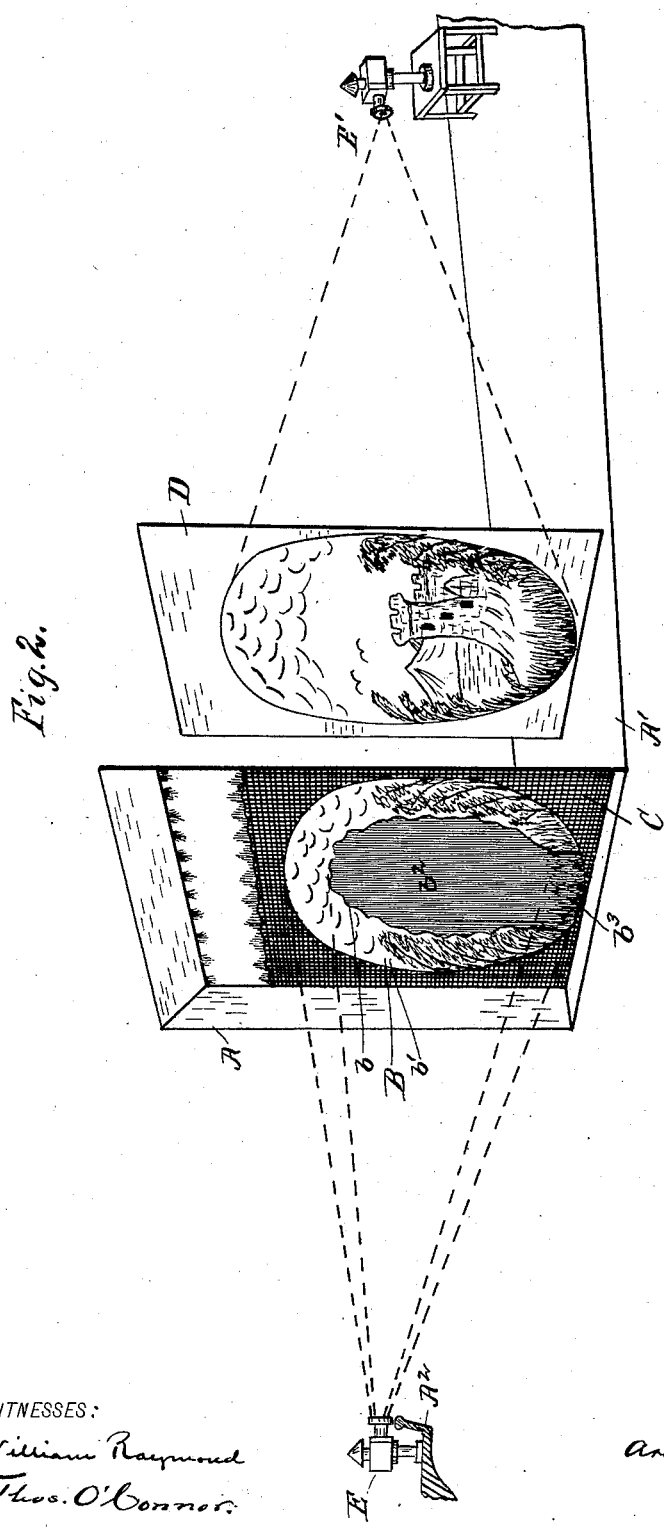

In the drawings, Figure 1 is a sectional perspective elevation of the proscenium and stage of a theater, together with the screens and appliances desirably employed to practice my invention and illustrating the carrying out of a feature thereof. Fig. 2 is a similar view of the same, illustrating the carrying out of further features of my invention. Fig. 3 is an enlarged front elevation of the form of centrally-apertured and reflective transparent forward screen preferably employed in practicing my invention; and Figs. 4, 5, and 6 show forms of stereopticon or magic-lantern picture-slides which may be employed for like purpose.

A represents the proscenium of a theater, A' the stage, and $A^2$ a gallery in the audience-chamber thereof. A further delineation and description of a theater structure is not necessary to an understanding of the nature and practice of my invention.

In carrying out my invention I employ a screen B, which is centrally and desirably widely apertured, as at $b$, thus giving a marginal area, as at $b'$, which may be of any desired extent or outline, but which is preferably irregularly circular, as shown. This marginal screen is desirably opaque and its front surface is reflective, and for these purposes it may be constituted of thick cloth which is impervious to light and which has a whitish forward face. The central aperture $b$ of the said screen B is preferably filled with a reflective transparent medium, as illustrated at $b^2$ and plainly shown in Fig. 3. This medium may be constituted of a plate of transparent glass; but for purposes of economy and convenience it is desirably formed of a sheet of gauze—such, for example, as a reticulated lace of comparatively fine mesh and whitish or light gray in color stretched taut across the said aperture. The central portion of said screen B thus constituted when viewed from the forward side thereof with no light behind it or with an area or panel of dark color, such as black or deep purple, arranged back of it is reflective from its forward surface, so that the image of a picture projected, as by a stereopticon or magic lantern, upon said surface either alone or in conjunction with a projection of the picture upon the marginal portion $b'$ also will be clearly and distinctly visible thereon, and when such image or a part thereof is obliterated from said central portion of the screen and a picture or object which is illuminated is placed to the rear of the screen the said central portion of the screen is so transparent that the picture or object behind it will be clearly and distinctly visible through it, while the described medium in said central portion will apparently have disappeared from view.

The described marginal screen $b'$, either with or without the described central portion $b^2$, may be hung or placed on the stage A' of a theater, located, desirably, at the proscenium-opening and inclosed or draped at its edges within the proscenium with a curtain C, which is preferably dark in color and opaque, as illustrated in Figs. 1 and 2. I also employ a further screen D, which is desirably of somewhat greater dimensions than the area of the screen B and is continuous throughout its extent and preferably translucent, and for these purposes the screen D may be constituted of a sheet of whitish or light gray thin muslin or cotton cloth or silk of close texture hung or stretched taut upon a suitable frame. This screen D, I locate to the rearward of the screen B, as upon the stage A', as illustrated in Figs. 1 and 2, and arranged with its plane preferably parallel to the plane of the screen B.

In carrying out my invention I project, by concentrated light thrown through a picture and refracting medium, an image of said picture upon the marginal portion $b'$ of the screen B and simultaneously similarly project the image of a picture upon the screen D, as illustrated in Fig. 2. In making said projections I may employ a stereopticon or magic lantern, as at E, located in a gallery G of the theater, using a picture-slide, such as is indicated in Fig. 6, to produce the image upon the marginal front screen $b'$, and I employ another stereopticon or lantern E', preferably located on the stage A' behind the screen D, using a picture-slide, such as is indicated in Fig. 4, to produce the image on said rear screen D, the said screen being translucent, as described, so that the image thereon appears on the forward face of said screen. The image on said rearward screen D is thus visible in the audience-chamber of the theater through the central aperture in the screen B in conjunction with the image on the marginal portion of said screen B, so that the said images constitute a homogeneous scenic representation viewed from the theater audience-chamber, as illustrated in Fig. 2.

I find it desirable in thus constituting a scenic representation to terminate the opaque reflective marginal screen $b'$ at some distance beyond the central line thereof on each side along the lower part which meets the stage-floor and to form said lower part of said screen between the ends of its opaque portion of a reflective transparent medium, as indicated at $b^3$, Fig. 3, preferably using gauze, such as described, as said medium. This arrangement of the marginal screen permits a view from the audience-chamber of the entire lower part of a figure or performer appearing on the stage between the forward and rearward screens in the scenic representation thereon projected, as described, while the reflective quality of the portion $b^3$ of the marginal screen will to a degree display to the audience the part of the image projected upon it, as indicated in Fig. 2.

In further carrying out my invention I project in the manner and by the means described the image of a picture upon the screen B, composed of the reflective opaque marginal portion $b'$ and the reflective transparent central portion $b^2$, which in this case desirably extends over and fills the lower part $b^3$ of the marginal portion of the screen, using a picture-slide, such as is shown in Fig. 4, in effecting such projection, then obliterating from said screen B the part of the image projected upon the portion $b^2$ thereof, which may be done by using the well-known "dissolver" device, in connection with a double stereopticon or lantern, to change the image projection from a picture-slide such as shown in Fig. 4 to a slide such as shown in Fig. 6, and simultaneously with such described obliteration projecting the image of a picture upon the screen D, using, for example, the slide shown in Fig. 4 therefor. When the images thus projected upon the screens are viewed in their described succession from the audience-chamber of the theater, the image upon the forward screen B will first appear thereon as a flat picture and will obscure the view of the stage behind it and the rearward screen D, and then the image on the central portion $b^2$ of the screen B will disappear, leaving the image upon the marginal portion $b'$ thereof to constitute a foreground and the image appearing on the screen D constituting the background of a homogeneous scenic representation, as indicated in Fig. 2.

In further carrying out my invention I may after evolving a scenic representation in the manner set forth obliterate the image projected upon the screen D and simultaneously project an image upon the portion $b^2$ of the screen B and then obliterate said image upon said part $b^2$ of screen B and simultaneously project an image upon the screen D. I may thus project a series of images of different pictures in succession upon the screen D in conjunction with images projected upon the marginal portion of screen B, thus evolving a series of scenic representations successively, while the images projected upon the portion $b^2$ of screen B during each interval between said successive projections of images upon the screen D will obscure the view of the stage and rearward screen D during such intervals and obviate the necessity for the employment of a movable curtain for such purpose.

In still further carrying out my invention I find it desirable to project upon the screen D simultaneously with the projection of an image upon the central portion $b^2$ of screen B an area of dark color or tint, such as dark purple, of an extent corresponding to the area of the said portion $b^2$ of screen B, as illustrated at $d$ in Fig. 1, the reflective quality of the described portion $b^2$ of said screen being thereby enhanced and the brilliancy of the image projected thereon consequently being heightened.

In practicing my invention it is of course understood that the usual illumination of the audience-chamber and stage of the theater is dimmed or extinguished during the production of scenic representations in the manner described, and it is intended in producing said representations to first project the image of a picture of richly-colored draperies or of a clouded sky upon the entire screen B from the lantern E and at the same time to project from the lantern E' an area of deep color, such as dark purple, upon the screen D, then to dissolve off from said screen B the said image thereon and from the screen D the said colored area $d$ and project upon the marginal portion $b'$ of screen B from said lantern E the image of a picture of, say, sky, with clouds and foliage and grasses, to constitute thereon a foreground and simultaneously to project upon the screen D from lantern E' the image of a picture of, say, a landscape to constitute a background, the said images on the said screens forming a homogeneous scenic representation viewed from the audience-chamber of the theater, and then at the expiration of the desired period of exhibition of said representation to dissolve off from the screen D and the marginal portion of screen B the said images thereon and to immediately project the described area of color upon said screen D and the original image or that of another decorative picture upon the screen B, and to continue to alternately make said projections and dissolvings successively upon the entire screen B and upon the marginal portion $b'$ thereof in conjunction with the screen D, using, preferably, decorative pictures for the images projected upon the entire screen B and scenic or illustrative pictures for the images projected upon the marginal portion $b'$ of screen B in conjunction with screen D, as set forth. The production in a constant succession of beautiful and pleasing illusions to the view of an audience may thus be made, and in the intervals between the presentations of the scenic or illustrative illusions upon both said screens the decorative images upon the front screen B, while holding the attention of the audience, will serve the purpose of the customary drop-curtain, as hereinbefore set forth. During the exhibition, as described, of a scenic representation upon both said screens figures or performers may be introduced on the stage in the space between the screens and may there move and perform in view of the audience in the usual manner. There being no light-rays passing from lantern E through the screen B at this time, such figures or performers will cast no shadows upon the screen D, so that the illusion will be perfectly preserved, and when the central transparant portion $b^2$ of the screen B is employed, as set forth, the light-rays projected from lantern E' through the translucent screen D may be so adjusted in intensity as to become diffused just in front of said screen D, so that the liability of a figure or performer on the stage between the screens to cast a shadow upon the portion $b^2$ of said screen B will be obviated. Moreover, hooded lights adapted to project illuminating-rays in a limited area—such, for example, as lamps commonly known as "slit-lights"—may be employed at one or both sides of the stage to project light upon and thus illuminate the figures or performers appearing between the screens.

What I claim as my invention, and desire to secure by Letters Patent, is—

1. The method of producing a scenic representation which consists in projecting, by concentrated light thrown through a picture and refracting medium, as by a stereopticon, an image of said picture upon the marginal portion of a centrally-apertured, forwardly-located screen, and simultaneously similarly projecting the image of a picture upon a continuous screen located rearwardly of said marginal screen; whereby, when said images are viewed from in front of said marginal screen, as upon the stage of a theater from the audience-chamber thereof, the image upon the marginal screen may constitute the scenic foreground and the image upon the rearward screen the scenic background of a homogeneous scenic representation.

2. In the production of a scenic representation by the projection, by concentrated light thrown through pictures and refracting mediums, as by stereopticons, of images of said pictures upon screens, the method of evolving and exhibiting such scenic representation which consists in projecting the image of a picture upon a forwardly-located screen composed of a reflective opaque marginal portion and a reflective transparent central portion, and then obliterating the image on said central portion thereof and simultaneously projecting the image of a picture upon a screen located rearwardly of said transparent screen; whereby, when said projected images are viewed in their succession from in front of said forward screen, as upon the stage of a theater from the audience-chamber thereof, the image first projected upon the forward screen will appear as a flat picture, obscuring the view of the stage and the rearward screen behind it, and thereafter, when said image is obliterated from said central portion of the forward screen, the image projected upon the rearward screen will be visible through said central portion of said forward screen.

3. In the production of scenic representations by the projection, by concentrated light thrown through pictures and refracting mediums, as by stereopticons, of images of said pictures upon screens, the method of evolving and exhibiting a series of such scenic representations, in succession, which consists in projecting the image of a picture upon a forwardly-located reflective transparent screen, then obliterating said image therefrom and simultaneously projecting the image of a picture upon a screen located rearwardly of said reflective transparent screen, and then obliterating said image from said rearward screen and simultaneously again projecting the image of a picture upon said reflective transparent screen; whereby images, in succession, of a series of different pictures may be projected at intervals upon said rearward screen and will be visible through said reflective transparent screen, when viewed from in front of said latter screen, as upon the stage of a theater from the audience-chamber thereof, and an image of a picture projected upon said reflective transparent screen, in each interval between the projections of images upon the rearward screen, may obscure the said view of said rearward screen during such intervals.

4. In the production of a series of scenic representations by successively projecting and obliterating images of pictures, as by stereopticons provided with dissolvers, alternately upon a forwardly-located reflective transparent screen and a screen located rearwardly of said reflective transparent screen, the method of evolving and exhibiting the said images projected upon the reflective transparent screen which consists in projecting upon said rearward screen, simultaneously with the projection of an image upon said reflective transparent screen, an area of dark color or tint corresponding in extent to the area of said reflective transparent screen; whereby the images projected upon said reflective transparent screen, when viewed from in front thereof, as upon the stage of a theater from the audience-chamber thereof, will be heightened and enhanced in effect.

Signed at New York city, State of New York, this 11th day of June, A. D. 1900.

ARDEN SEYMOUR FITCH.

Witnesses:
    J. O'CONNOR,
    WILLIAM RAYMOND.